United States Patent [19]

Nielsen

[11] Patent Number: 5,052,290
[45] Date of Patent: Oct. 1, 1991

[54] CHEESE-MAKING TANK

[75] Inventor: Per G. Nielsen, Silkeborg, Denmark

[73] Assignee: APV Pasilac A/S, Soborg, Denmark

[21] Appl. No.: 520,910

[22] Filed: May 9, 1990

[30] Foreign Application Priority Data

May 16, 1989 [DK] Denmark ............................ 2372/89

[51] Int. Cl.⁵ ...................... A01J 13/00; A01J 25/00; A23C 3/02; A23C 9/00
[52] U.S. Cl. ........................................ 99/461; 99/452; 99/460; 99/466; 366/261
[58] Field of Search ................. 99/452, 453, 456, 459, 99/460–462, 466, 348; 366/297, 261, 285; 426/582; 241/98, 101.1

[56] References Cited

U.S. PATENT DOCUMENTS

| 347,312 | 8/1886 | Barnesley | 366/297 |
|---|---|---|---|
| 1,823,637 | 9/1931 | Wright | 99/461 |
| 3,733,702 | 5/1973 | Robertson et al. | 99/462 |
| 3,836,688 | 9/1974 | Fischer et al. | 99/460 |
| 4,182,232 | 1/1980 | Tomatis | 99/461 |
| 4,206,880 | 6/1980 | Stanton | 366/297 |
| 4,321,860 | 3/1982 | Hazen | 99/453 |
| 4,331,069 | 5/1982 | Tomatis | 99/348 |
| 4,501,196 | 2/1985 | Loichinger et al. | 426/582 |
| 4,612,853 | 9/1986 | Kostiainen et al. | 366/297 |
| 4,802,407 | 2/1989 | Negri et al. | 99/466 |

FOREIGN PATENT DOCUMENTS

| 93647 | 11/1983 | European Pat. Off. . | |
| 85 12538 | 11/1985 | Fed. Rep. of Germany . | |
| 3643135 | 6/1988 | Fed. Rep. of Germany . | |
| 6616865 | 5/1968 | Netherlands . | |
| 9004919 | 5/1990 | PCT Int'l Appl. | 99/462 |
| 1430000 | 10/1988 | U.S.S.R. | 99/462 |

Primary Examiner—Timothy F. Simone
Attorney, Agent, or Firm—Lowe, Price, LeBlanc & Becker

[57] ABSTRACT

A cheese-making tank comprising a cylindrical container provided with a first cutting frame with cutting wires forming a netting, said cutting frame being displaceable forwards and backwards along the lower portion of the container from a first position at one end of the container to a second position at the other end of the container. It is further provided with a second cutting frame with radially extending cutting wires, said cutting frame being pivotally arranged about a longitudinal axis and with stirring means to be lowered into the lower portion of the container in order to carry out stirring movements therein. When being in the second position, the first cutting frame can be turned into the upper portion of the container while the stirring means are working.

9 Claims, 7 Drawing Sheets

CHEESE-MAKING TANK

FIELD OF THE INVENTION

The invention relates to a cheese-making tank comprising a cylindrical container, said container being provided with a first cutting frame with cutting wires forming a netting, said cutting frame being displaceable backwards and forwards along the lower portion of the container from a first position at one end of the container to a second position at the other end of the container, a second cutting frame with radially extending cutting wires, said cutting frame being pivotally arranged about a longitudinal axis, and stirring means to be lowered into the lower portion of the container in order to carry out stirring movements therein.

BACKGROUND ART

Cheese-making tanks are known which are provided with a horizontally orientated container which according to a vertical sectional view is of a guttiform cross section. The cheese-making tank has a first cutting frame with vertical and horizontal wires. The first cutting frame extends in a radial plane and is displaceable backwards and forwards along the central axis of the container. A second cutting frame with radial wires is provided inside the cheese-making tank. The second cutting frame extends in an axial plane in relation to the same central axis and is adapted to be moved about said axis.

During the use of said cheese-making tank, the lower semicircular portion of the container is filled with milk which is caused to curdle by means of enzyme and acid, acid alone or a compound coagulant. The curd is then cut into cubes by the first cutting frame first being drawn through the container from one end to the other and then passing the second cutting frame across the curd. The curd is thereby cut into small cubes from which whey seeps out and is drained off. Following the cutting the curd is stirred.

It is important for the structure of the end product that the curd cubes have the desired edge length and are as uniform as possible in size. Therefore, the cutting process must be carried out without destroying the cubes and without curd particles thereby being lost in the whey. The latter is to a great extent avoided by means of said cheese-making tank but in the portion around the longitudinal first cutting frame the curd cubes tend to be driven against the wires of the first cutting frame whereby curd particles are formed which are lost in the whey when said whey is drained off later in the process, said first cutting frame being placed at the other end (in the second position) protruding in the curd during the transverse cutting.

SUMMARY OF THE INVENTION

Accordingly, it is the object of the present invention to provide a cheese-making tank which further limits the loss of curd particles in the whey.

In satisfaction of the foregoing object and advantages there is provided by the present invention a cheese-making tank wherein the first cutting frame is adapted to be turned into the upper portion of the container when being in the second position and while the stirring means are working.

According to the invention, the first cutting frame is fastened to a carrying device, said carrying device being displacably arranged on guiding means in an axial direction, said guiding means being firmly connected to the second cutting frame and said guiding means extending in direct continuation of guiding means of a rotating device when the first cutting frame is in the lower portion of the container, said rotating device being rotatably mounted about the same axis of rotation as the second cutting frame at the end of the container, at which the first cutting frame has its second position, the carrying device engaging both the guiding means of the second cutting frame and the guiding means of the rotating device when said rotating device is in the second position in the lower portion of the container, and wherein the carrying device is adapted to disengage the guiding means of the second cutting frame and be placed in a holding position when turned into the upper portion of the container. The turning of the second cutting frame automatically causes a lifting of the first cutting frame from the curd and into the upper portion of the container where it is left while the stirring means are working.

According to a particularly advantageous embodiment the driving means of the first cutting frame for initiating the axial displacement are mounted in the rotating device, whereby said driving means follow the rotating device during its movements.

Furthermore, according to the invention the carrying device of the first cutting frame is provided with a rotatably beared drivable gear engaging a first axially extending rack, said rack being firmly connected to the second cutting frame and when the guiding means of the second cutting frame extend in continuation of the guiding means of the rotating device, said rack extends in continuation of a likewise axially extending second rack firmly connected to the rotating device. As a result, the first cutting frame is moved forwards and backwards within the container into engagement with the rotating device in a particularly simple manner.

Moreover according to the invention the gear is firmly connected to a pivotally arranged sprocket driven from the outer side of the container by means of a chain drive, said chain drive extending axially through the container and co-operating with driving means mounted in the rotating device on the outer side of the container. In this manner particularly simple means for driving the gear and consequently the first cutting frame during its longitudinal movement are provided.

According to a particularly advantageous embodiment of the invention the guiding means on the second cutting device and on the rotating device are a set of U-shaped rails placed opposite each other, while the carrying device is provided with wheels co-operating therewith.

According to the invention the second cutting frame and the stirring means are firmly connected to each other and extend to each side in a substantially horizontal plane during the axial movement of the first cutting device through the container, whereby is ensured in a simple manner that the second cutting frame and the stirring means are removed from the lower portion of the container while the first cutting frame travels forwards and backwards in this portion. At the same time it is ensured in a simple manner that the second cutting frame and the stirring means are not immersed in the curd at the same time.

According to a particularly advantageous embodiment of the invention the second cutting frame is fastened to a rotatably arranged pipe extending coaxially with the axis of rotation and carrying on the outer side the guiding means and the rack for the carrying device of the first cutting frame as well as a number of radially projecting stirring means situated diametrically opposite the second cutting frame.

Finally according to the invention the pipe carrying the second cutting frame and the stirring means is firmly connected to an axially extending axle journal, said axle journal being rotatably journaled inside the rotating device, thereby providing a particularly stable support of the pipe by means of the second cutting frame and the stirring means.

BRIEF DESCRIPTION OF THE DRAWINGS

The invention is explained in greater details below with reference to the accompanying drawings in which.

DESCRIPTION OF PREFERRED EMBODIMENTS

Figure 1:
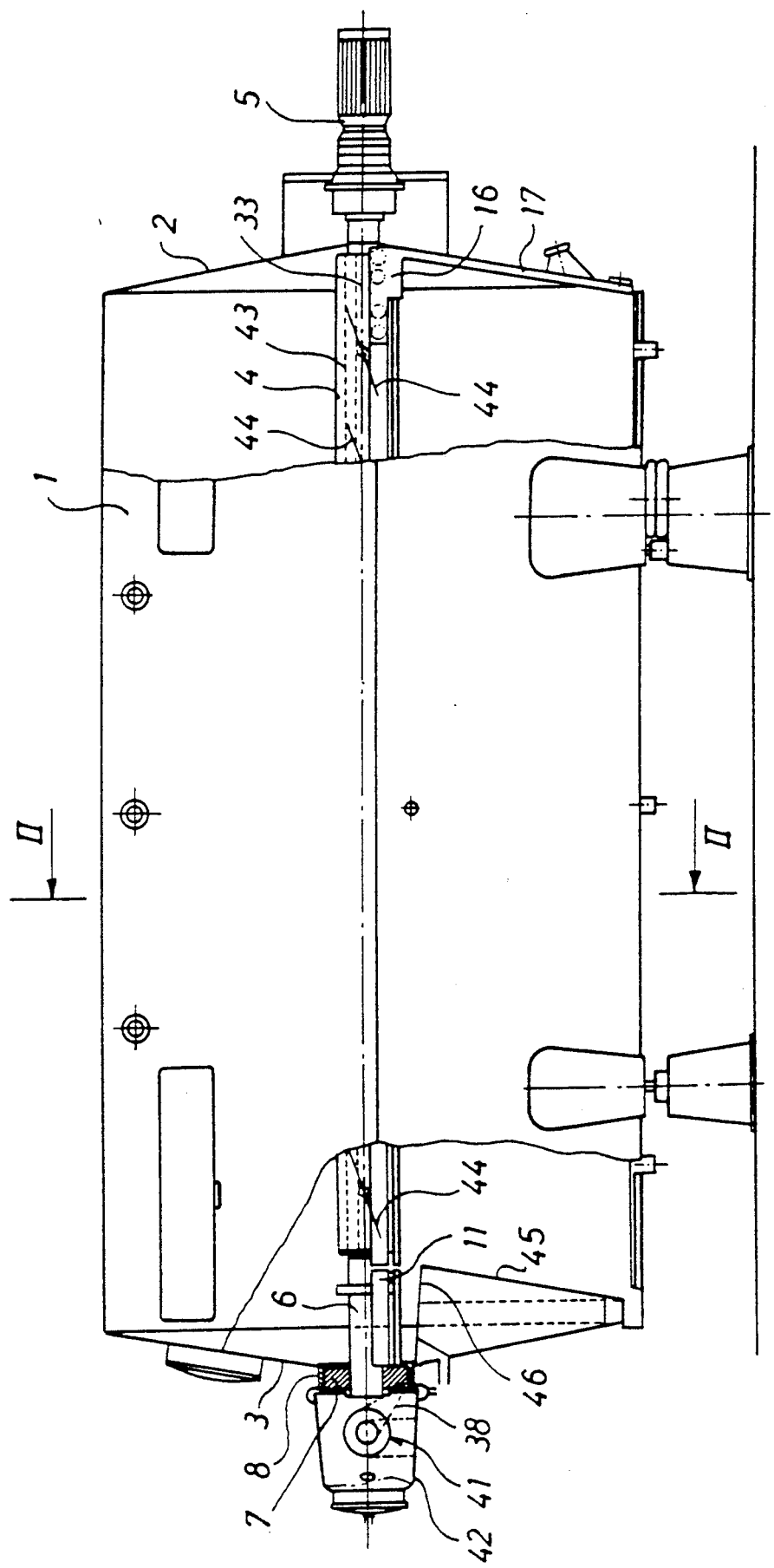
FIG. 1 is a diagrammatic side view of a cheese-making tank according to the invention, portions having been omitted for the sake of clarity.
Figure 2:
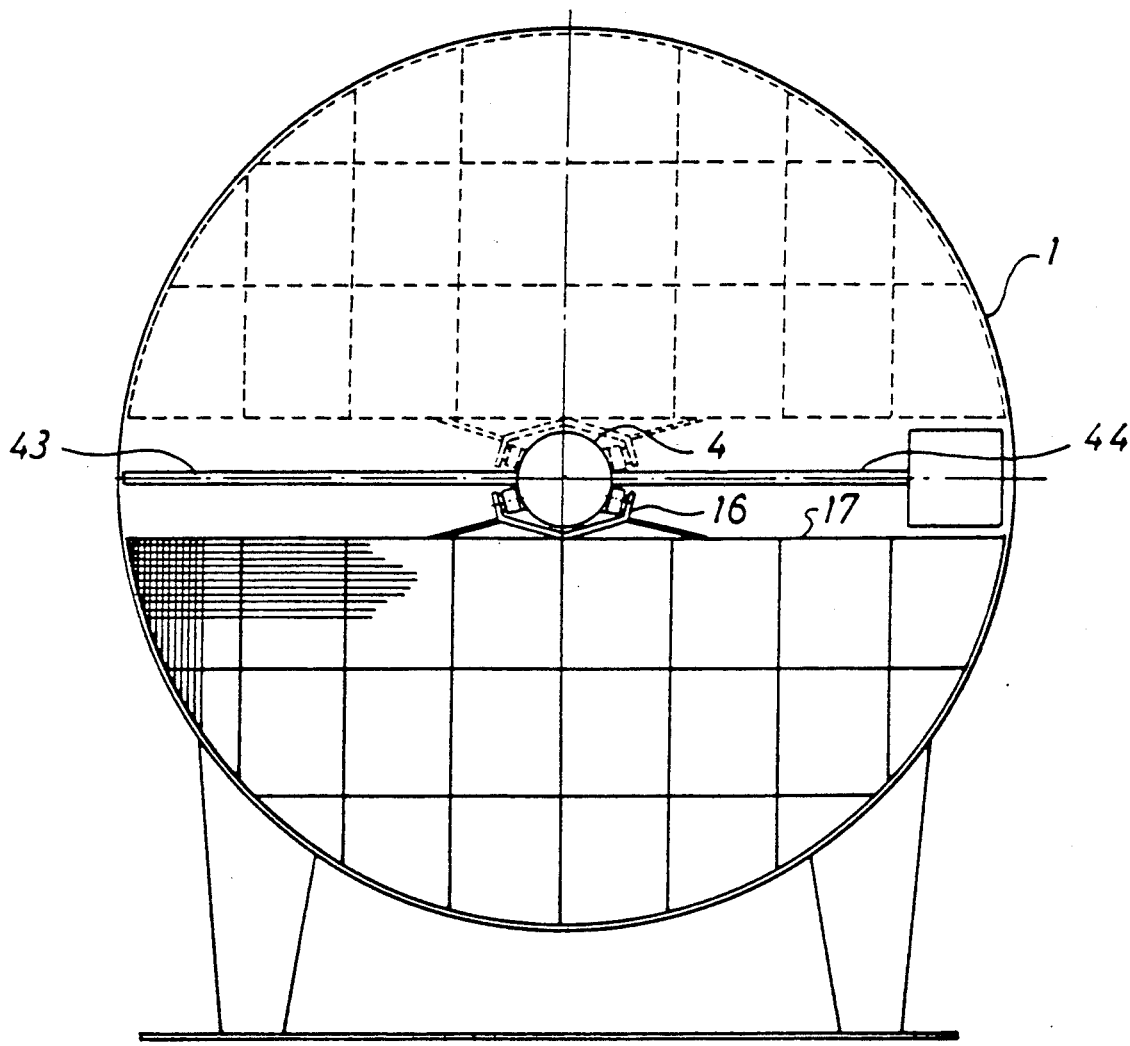
FIG. 2 is a diagrammatic sectional view taken along the line II—II of FIG. 1.

The cheese-making tank of FIGS. 1 and 2 comprises a cylindrical container 1 of a circular cross section, and conical end walls 2 and 3. A rotatably arranged shaft 4 is provided centrally inside the container 1, said shaft having the form of a pipe and being directly connected to a motor 5 at one end, i.e. the right end viewed in relation to FIG. 1, said motor being fastened to the outer side of the container 1 in a non-specified manner. At the other end, i.e. the left end viewed in relation to FIG. 1, the shaft 4 is firmly connected to an axle journal 6 of a circular cross section. The axle journal 6 is rotably arranged in a sturdy bearing 7, said bearing 7 being rotably arranged on the outer side of the container 1 in a circumferential bearing collar 8 firmly connected to the end wall 3 of the container 1.

Longitudinal guiding rails 9 and 10 of a U-shaped cross section have been fastened on each side symmetrically around the vertical center plane of the shaft 4 (viewed in relation to the position of the shaft shown in FIGS. 1 and 2). In the axial direction these guiding rails 9, 10 end adjacent the area around the transition between the shaft 4 and the axle journal 6 where they abut guiding rails 11, 12 of the same cross section. The guiding rails 11, 12, in the position of the bearing 7 shown in FIG. 1, extend in direct alignment with the guiding rails 9 and 10 on the shaft and are fastened to the bearing 7 at the ends, cf. also FIG. 5. At an appropriate distance from the bearing 7, the guiding rails 11 and 12 fastened hereonto are rotatably supported on the axle journal 6. For this use a circumferential flange 13 has been fastened to the axle journal 6. A ring 14 extends around said flange, said ring being fastened directly to the rails 11 and 12. A thin plastic ring 15 has been placed between the flange 13 and the ring 14, said plastic ring facilitating their mutual rotary movement.

Figure 4:
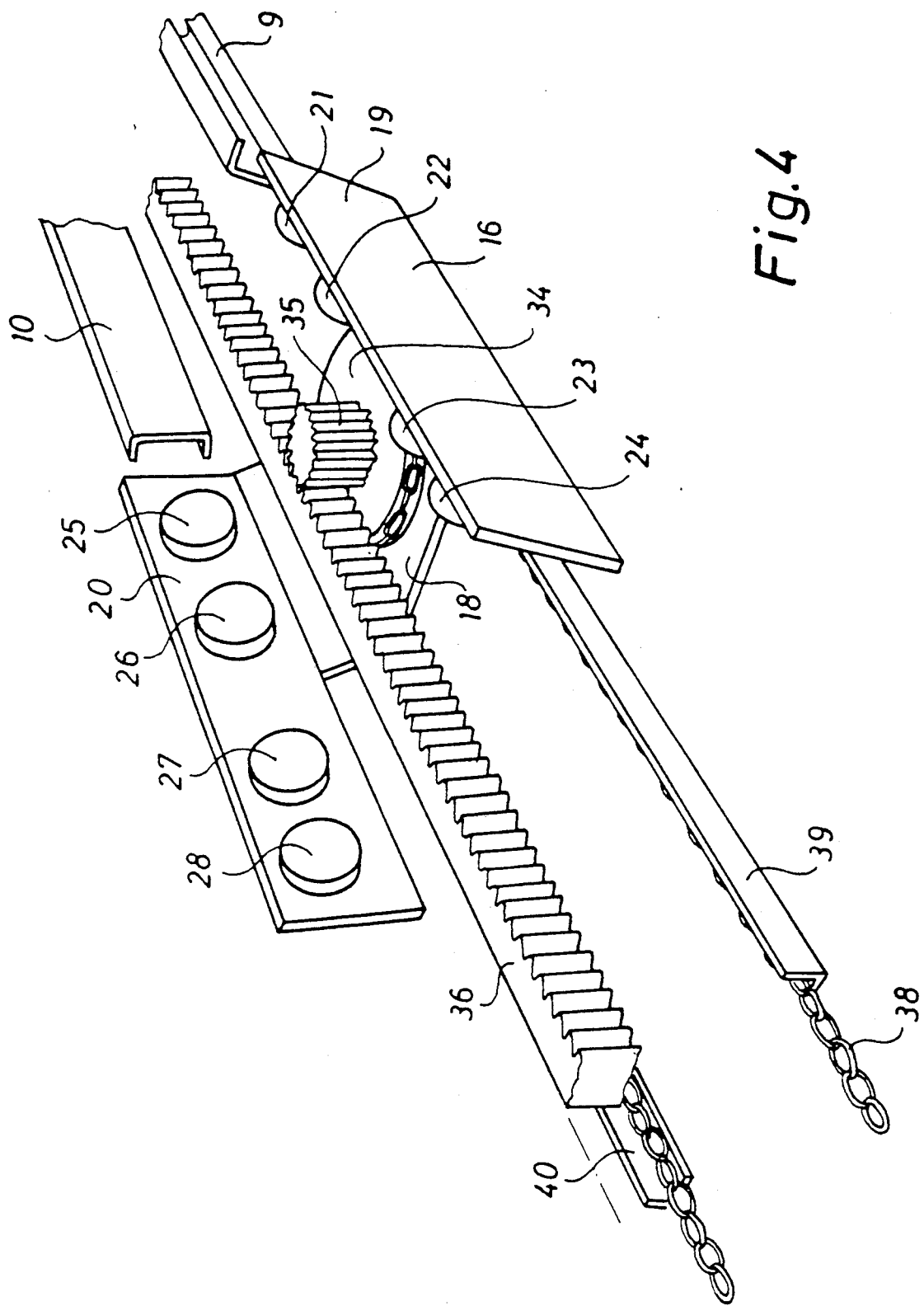
FIG. 4 is a perspective view of the carrying device for a first cutting frame with parts cooperating therewith.

The guiding rails 9, 10, 11 and 12 are used to carry and guide a carrying device 16 for a first cutting frame 17. The carrying device 16 shown in perspective view in FIG. 4, is of a substantially U-shaped cross section, the bottom of the U forming a base 18 connecting the two sides 19 and 20 of the U. These two sides are extended in the longitudinal direction of the container to one side of the base 18 and each side carry four wheels 21, 22, 23, 24 and 25, 26, 27 28, respectively, engaging the two opposite sets of rails 9, 11 and 10, 12 respectively.

The first cutting frame 17 carried by the carrying device 16, is connected to said carrying device 16 by means of connecting rods 29 and 30. The first cutting means is of a substantially commonly known structure and therefore not shown in greater detail, said first cutting means carrying a netting of cutting wires 31 and 32 extending perpendicularly to each other at substantially the same mutual distance of preferably 8 mm. The first cutting frame 17 carries these wires in a substantially radial plane perpendicular to the central axis 33 of the shaft 4. However, as shown in FIG. 1 wherein the carrying device 16 with the cutting frame 17 is shown in a first position at the extreme right against the end wall of the container, said first cutting frame 17 has the form of a portion of a conical surface allowing it to abut the end wall 2 of the container in the first position. The fist cutting frame 17 covers the greater part of the lower half of the sectional area of the container 1 under the path of the carrying device.

Figure 3:
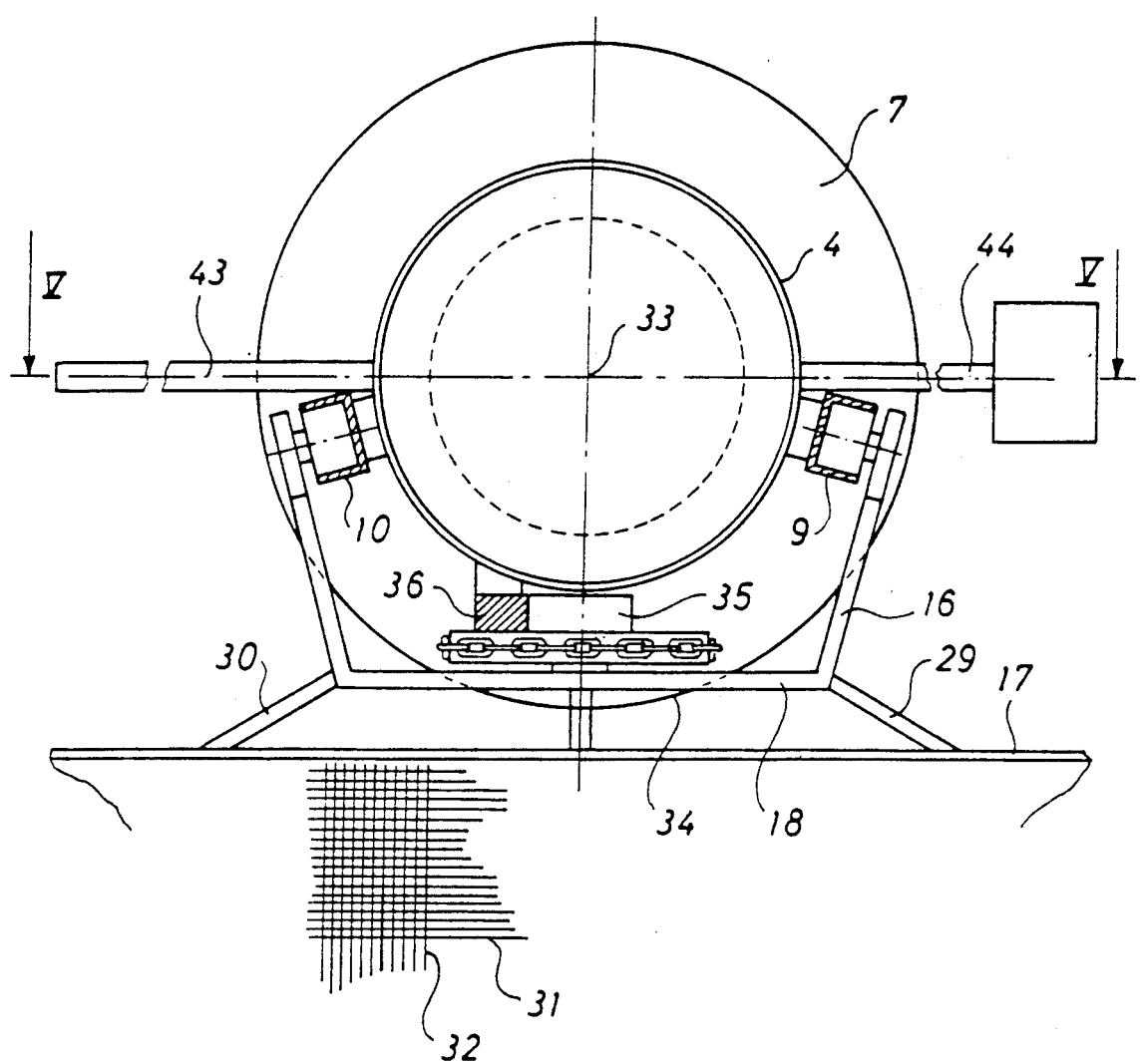
FIG. 3 shows the central portion of FIG. 2 on a larger scale.

As illustrated in inter alia FIGS. 3 and 4, a sprocket 34 is mounted on the base of the carrying device 16, said sprocket being pivotally supported about a vertical axis, whereby said axis coincides with the center plane of the container 1. A gear 35 is coaxially fastened to the top side of the sprocket 34, said gear engaging a rack 36 firmly mounted on the outer side of the shaft 4 parallel to the guiding rails 9 and 10. Like the guiding rails 9 and 10, the rack 36 ends within the area of the transition between the shaft 4 and the axle journal 6 where in the position shown in FIG. 1 it abuts a rack 37, cf. also FIG. 5, said rack 37 like the guiding rails 11 and 12 being fastened to the bearing 7 and the ring 14 around the axle journal 6. The two racks 36 and 37 are formed in such a manner that they allow the gear 35 to move from engagement with one rack to engagement with the other without difficulty, when they extend in continuation of each other in the position shown in FIG. 1.

A chain 38 extends around the sprocket 34. The chain runs parallel to the axis 33 of the container supported by rails 39 and 40 cf. FIG. 4, and continues to the left end 3 shown in FIG. 1, where it passes through openings not shown in the large bearing to engagement with a commonly known chain drive, cf. FIG. 5, comprising two sprockets 48, 49 fastened to a common shaft 47, said sprockets 48, 49 being driven by a motor 50. The two ends of the chain pass opposite ways around each of the two sprockets. The chain drive is illustrated by the general reference numeral 41 inter alia in FIG. 5. The chain drive 41 is mounted in a chain housing 42, fastened to the outer side of the bearing 7 in any appropriate manner. The chain drive 41 is adapted to rotate the sprocket 34 of the carrying device 16 in one direction or the other as desired and thereby also the gear 35 in the same direction, whereby as a result of the engagement of the gear 35 with the racks 36 and 37 the carrying device is moved forwards and backwards in the container in axial direction together with the first cutting frame 17.

As appears from inter alia FIG. 3, a second cutting frame 43 and a row of stirring means 44 not described in more detail have been mounted diametrically opposite each other on each side of the shaft 4. The second cutting frame 43 which is of a commonly known type and therefore not shown in greater detail, carries a row of wires mounted radially in relation to the shaft 4, said wires preferably having the same mutual distance as the wires 31 and 32 in the first cutting frame 17, e.g. 8 mm. The second cutting frame 43 covers an area corresponding to half the radial sectional area of the container 1 outside the shaft 4 and to the wall of the container 1.

Figure 5:
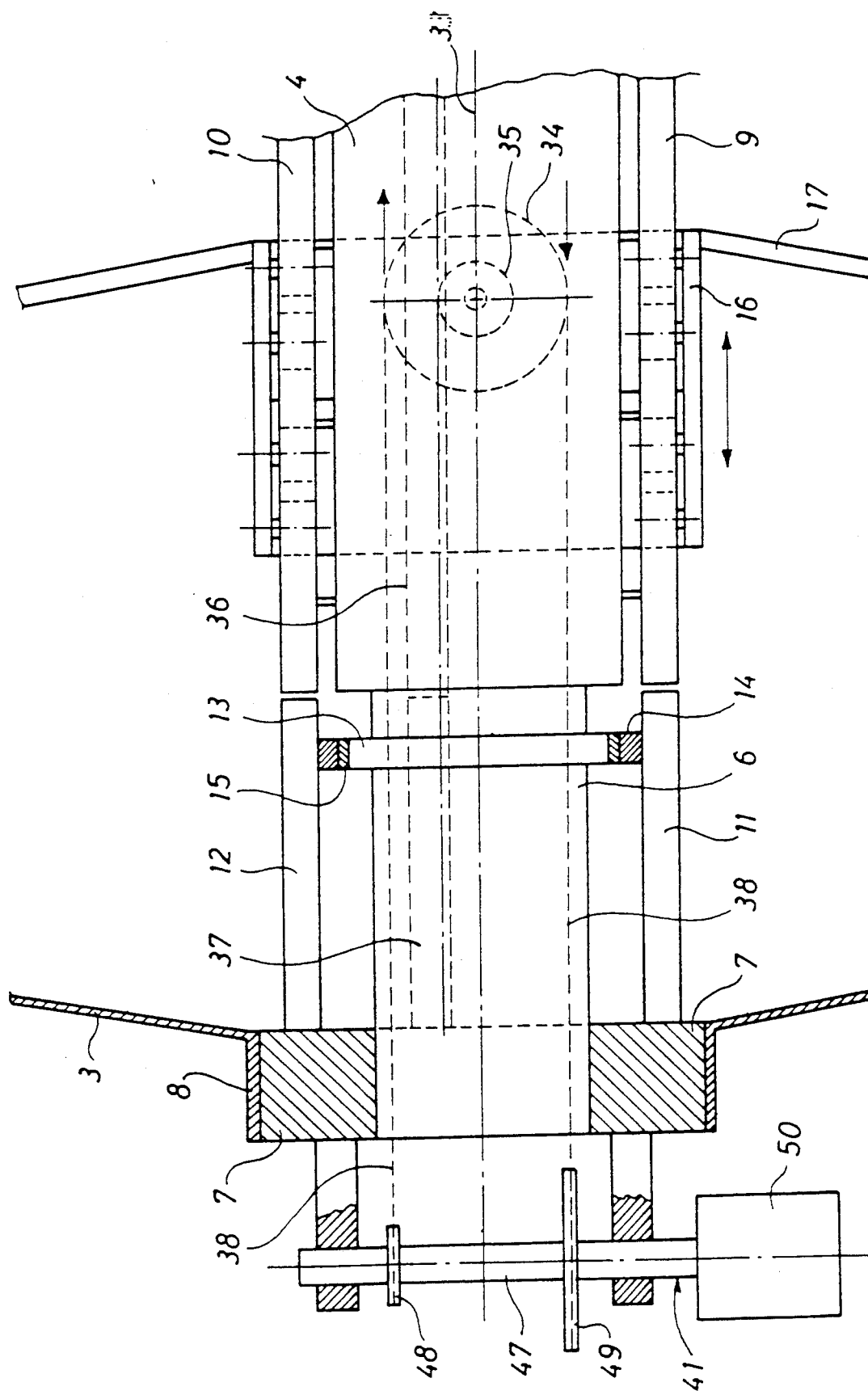
FIG. 5 is a sectional view taken along the line VI—VI of FIG. 3 near the right end of the cheese-making tank of FIG. 1, with some portions having been omitted for the sake of clarity, and the carrying device with the first cutting frame near its second position.

By use from the starting position, i.e. the first position, of first cutting frame 17 shown in FIG. 1, said cutting frame is moved to the extreme left into a second position by means of said chain drive 41. In this second position it abuts a wall 45 having the form of a portion of a cone and covering the lower portion of the container 1, said container being separated from the end wall 3 by means of an almost horizontally extending platform 46. FIG. 5 is a plan view of the carrying device 16 with the first cutting frame 17 on the way in and out of this second position.

Figure 6:
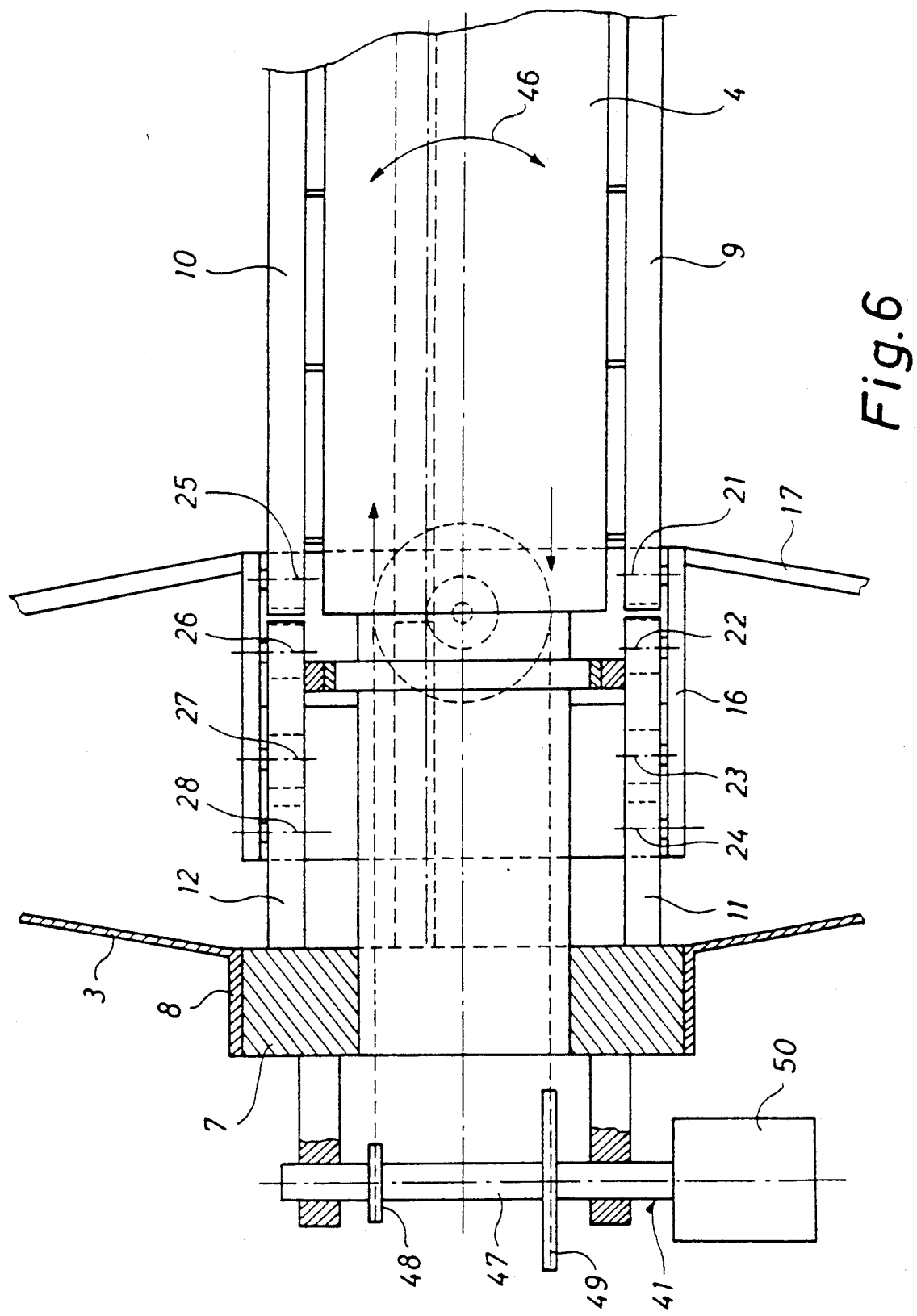
FIG. 6 is a sectional view taken along the line VI—VI of FIG. 3, but with the carrying device with the first cutting frame placed in the second position.
Figure 7:
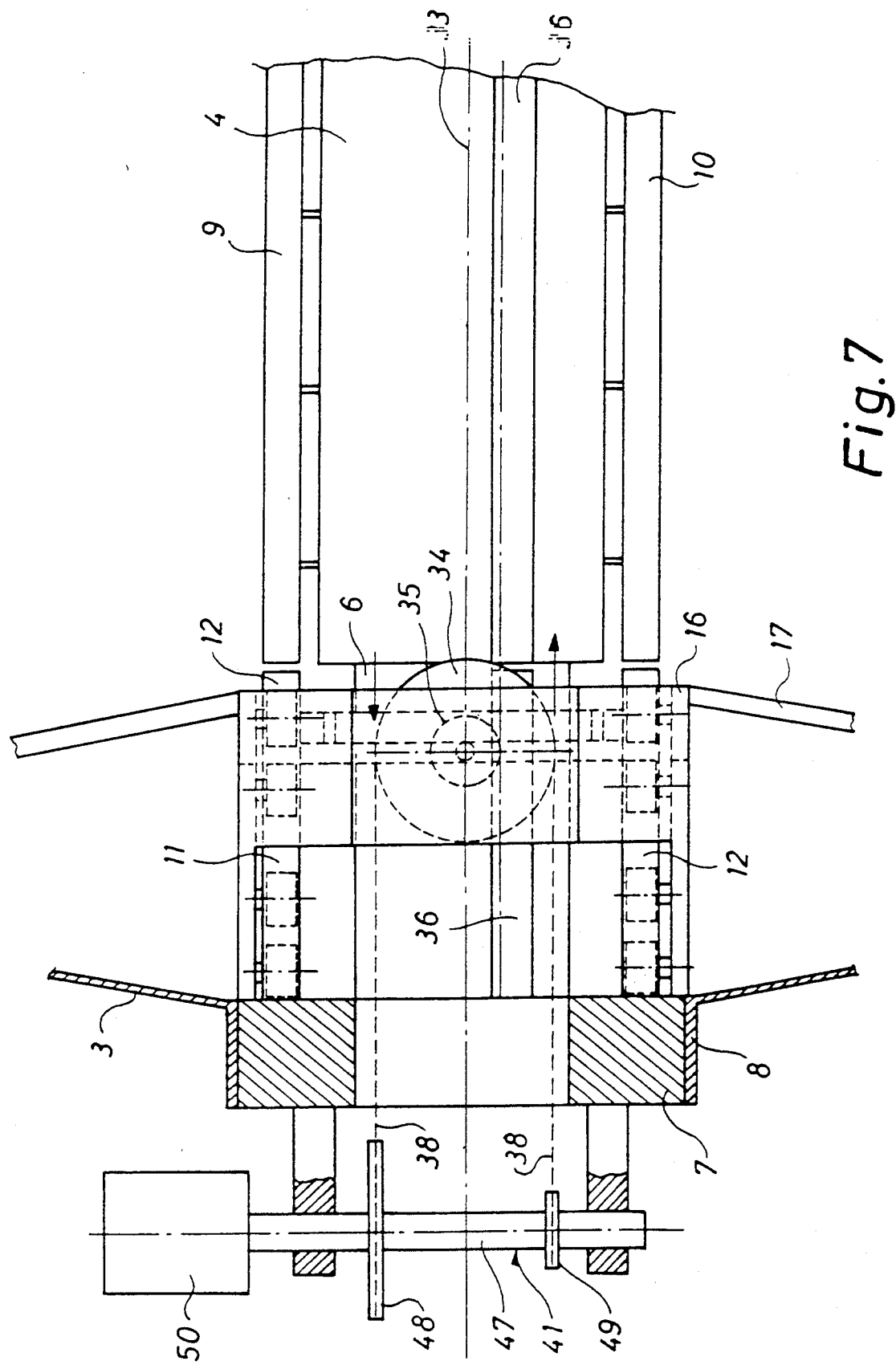
FIG. 7 is a sectional view taken along the line VI—VI of FIG. 3 but with the carrying device with the first cutting frame placed in a holding position and indicated by means of solid lines.

FIG. 6 shows the carrying device 16 with the first cutting frame 17 in the second position. As illustrated in FIG. 6, the wheels 21-28 of the carrying device engage both the guiding rails 9 and 10 on the shaft 4 and the guiding rails 11 and 12 firmly connected to the bearing 7. In this second position of the first cutting frame 17 the carrying device 16 thus forms a coupling means between the two sets of guiding rails 9, 10 and 11, 12, respectively. At subsequent rotation of the shaft 4 by means of the motor 5 around the longitudinal central axis of the container 1, as indicated by an arrow 46, the rails 11 and 12 and thereby the bearing 7 and the chain drive 41 are drawn along because of the coupling position of the carrying device 16. The first cutting frame 17 is turned 180° about the longitudinal central axis of the container to a position in the upper half of the container 1 by means of the motor 5: FIG. 7 shows the shaft 4, the bearing 7 and the chain drive 41 in said position following the 180° turn. From the coupling position in engagement with the two sets of guiding rails 9, 11 and 10, 12, respectively, the carrying device 16 is moved together with the first cutting frame 17 a further distance towards the adjacent end wall 3 of the container 1. In this so-called holding position of the cutting frame 17 shown in FIG. 7, the carrying device 16 only engages the rails 11 and 12 firmly connected to the bearing 7 and thereby also to the chain drive 41. In this position the gear 35 on the base of the carrying device 16 is also disengaged from the rack 36 on the shaft 4. In this holding position for the cutting frame 17 the shaft 4 with the second cutting frame 43 and stirring means 44 (not shown in FIGS. 5, 6 and 7 for the sake of clarity) fastened thereto can be rotated about the axis of rotation 33 of the container by means of the motor 5.

As appears from FIG. 2 a turning of the first cutting frame 17 into the upper portion of the container 1 by means of the shaft 4 automatically results in the second cutting frame 43 being moved from its horizontal position in one side of the container through the lower portion of the container and into a horizontal position in the other side of the container. At the same time the stirring means 44 pass through the upper portion of the container. Having moved the first cutting frame 17 to its holding position by means of the chain drive 41, the motor 5 subsequently moves the stirring means 44 into the lower portion of the container 1 by continued rotation of the shaft, where the stirring means 44 are imparted a pendulum movement as desired, for instance over an angle of 45°, 60° or 120°.

During the use of the cheese-making tank its lower portion is filled with milk while the first cutting frame 17 is in the holding position in the upper portion of the container 1 shown in FIG. 7. If desired, the milk is then stirred by means of the stirring means 44, the desired coagulants either being added during or after the introduction of the milk. Following the stirring, the shaft 4 is returned to the position in which the guiding rails 9 and 10 extend in continuation of the guiding rails 11 and 12 on the bearing 7. The carrying device 16 with the first cutting frame 17 is subsequently driven forward in the direction away from the end wall 3 by means of the chain drive 41 and into the coupling position mentioned above. In this position the shaft 4 is again turned 180° back about its axis of rotation 33 whereby the first cutting frame 17 is brought into the second position shown in FIG. 6. By means of the chain drive 41 the first cutting frame 17 is then moved forward to the end wall 2 adjacent the motor 5 whereby it is placed in said first position. When the milk has coagulated, the first cutting frame is moved back to the second position and from here into the upper portion of the container while the second cutting frame 43 passes through the curd in a transverse direction. The first cutting frame is then moved into a holding position while the stirring by means of the stirring means 44 is carried out as described above.

The invention is described with reference to a preferred embodiment. It may be varied in many ways without thereby deviating from the scope of the invention. For instance the first cutting frame 17 may be driven forwards and backwards in an axial direction by means of other means than those described here. As indicated in FIG. 1, the chain drive may for instance comprise two sprockets 48, 49 driven about a common axis 47, the chain 38 passing these wheels in separate directions. The chain might, however, also pass in the same direction, the wheels then being alternately coupled to the axis of rotation by means not specified.

I claim:

1. A cheese-making tank comprising a cylindrical container, said container being provided with a first cutting frame with cutting wires forming a netting, said cutting frame being displaceable backwards and forwards along the lower portion of the container from a first position at the one end of the container to a second position at the other end of the container, a second cutting frame with radially extending cutting wires, said cutting frame being pivotally arranged about a longitudinal axis, and stirring means to be lowered into the lower portion of the container in order to carry out stirring movements, wherein the first cutting frame (17) is adapted to be turned into the upper portion of the container when being in the second position and while the stirring means (44) are working.

2. A cheese-making tank as in claim 1, wherein the first cutting frame (17) is fastened onto a carrying device (16) said carrying device being displacably arranged on guiding means (9, 10) in an axial direction, said guiding means being firmly connected to the second cutting frame (43) and said guiding means extending in direct continuation of guiding means (11, 12) of a rotating device (7) when the first cutting frame (17) is in the lower portion of the container, said rotating device being rotatably mounted about the same axis of rotation (33) as the second cutting frame (43) at the end of the container (1), at which the first cutting frame (17) has its second position, the carrying device engaging both the guiding means (9, 10) of the second cutting frame (43) and the guiding means (11, 12) of the rotating device (7) when said rotating device is in the second position in the lower portion of the container, and wherein the carrying device (16) is adapted to disengage the guiding means (9, 10) of the second cutting frame (43) and be placed in a holding position when turned into the upper portion of the container (1).

3. A cheese-making tank as in claim 2, wherein the driving means (41) of the first cutting frame for initiating the axial displacement have been mounted in the rotating device (7).

4. A cheese-making tank as in claim 2, wherein the carrying device (16) of the first cutting frame (17) has a rotatably arranged drivable gear (35), engaging a first axially extending rack (36), said rack being firmly connected to the second cutting frame (43) and when the guiding means of the second cutting frame (43) extend in continuation of the guiding means (11, 12) of the rotating device (7), said rack extends in continuation of a likewise axially extending second rack (37) being firmly connected to the rotating device (7).

5. A cheese-making tank as in claim 4, wherein the gear (35) is firmly connected to a rotatably mounted sprocket (34), said sprocket being driven from the outer side of the container (1) by means of a chain drive (38), said chain drive extending axially through the container (1) and co-operating with driving means (41) mounted in the rotating device (7) on the outer side of the container.

6. A cheese-making tank as in claim 2, wherein the guiding means (9, 10) on the second cutting means (43) and on the rotating device are a set of U-shaped rails placed opposite each other, and wherein the carrying device (16) is provided with wheels (21-28) co-operating therewith.

7. A cheese-making tank as in claim 2, wherein the second cutting frame (43) and the stirring means (44) are firmly connected to each other and extend to each side in a substantially horizontal plane during the movement of the first cutting means axially through the container (1).

8. A cheese-making tank as in claim 4 wherein the second cutting frame (43) is fastened to a rotatably arranged pipe (4) extending coaxially with the axis of rotation and carrying on the outer side the guiding means (9, 10) and the rack (36) for the carrying device of the first cutting frame (17) as well as a number of radially projecting stirring means (44), situated diametrically opposite the second cutting frame (43).

9. A cheese-making tank as in claim 8 wherein the pipe (4) carrying the second cutting frame (43) and the stirring means (44) are firmly connected to a coaxially extending axle journal (6), said axle journal being pivotally arranged inside the rotating device (7).

* * * * *